March 11, 1969 — R. M. WOODS — 3,431,667
X-RAY FILM MOUNT
Filed June 7, 1965
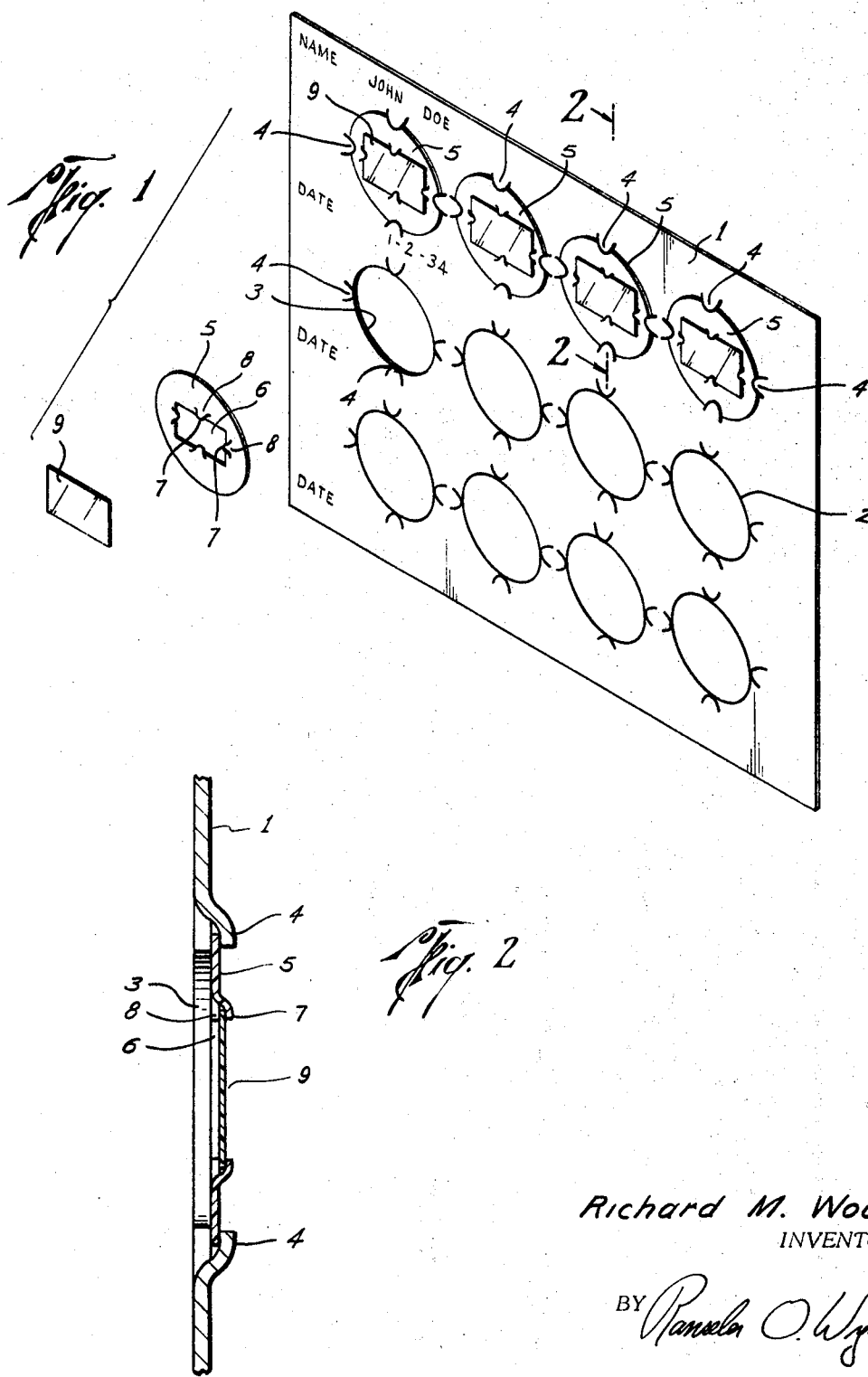
Richard M. Woods
INVENTOR.
BY Pamela O. Wyatt
ATTORNEY 3,431,667
X-RAY FILM MOUNT
Richard M. Woods, Woods Bldg., Baytown, Tex. 77520
Filed June 7, 1965, Ser. No. 461,853
U.S. Cl. 40—158    5 Claims
Int. Cl. G09f 1/10

This invention relates to new and useful improvements in an X-ray data mount.

It is an object of this invention to provide a mount for retaining dental X-rays, and the like, where the X-ray film may be mounted in a retainer and the retainer mounted in viewing position in the card, so that the film may be observed and compared with films at later dates.

It is another object of the invention to provide a novel X-ray data mount having cuts therein to provide disc retainers and discs to be mounted on said card having film retainers.

In the practice of dental medicine, small X-ray pictures are made of the individual teeth of the patient, and where such teeth are undergoing treatment by the dentist, it is the practice to retake pictures of these teeth at specified intervals for the purpose of observing the progress of the treatment. The X-rays being small, light, rectangular film, similar in appearance and requiring illumination to be properly observed, and having very little area on which to receive markings, it is difficult to maintain an orderly record, easily referred to. It is an object of this invention to provide means for permanently maintaining such records with the necessary data inscribed adjacent each picture.

With the above and other objects in view, the invention is more particularly defined in the following specifications and illustrated in the accompanying drawings, wherein:

FIGURE 1 is an elevational perspective view of the film mount, with the film and holding disc of one window in exploded position.

FIGURE 2 is a side elevational cross sectional view taken on the line 2—2 of FIGURE 1.

Referring now more particularly to the drawings, the numeral 1 designates a rigid data sheet, such as a cardboard rectangle, in which circular partial perforations 2, 2 are formed in a series of rows to provide the punch-out windows 3. Cuts are made in the cardboard as at 4, 4 adjacent the periphery of the windows 3, 3 to provide suitable ears which may be bent outwardly to receive the rigid discs as 5. The discs 5 are formed of thin, rigid material, such as a light plastic or stiff paper, and are preferably colored black, or similarly made nontransparent, and are of slightly greater diameter than the windows 3. A rectangular window 6 is formed in the discs, with the inwardly projecting shoulders 7, 7 in the sidewalls of said window 6. The shoulders 7, 7 have slits formed therein as at 8, 8 which receive the side margin of the film 9 and maintain same in position in the disc 5.

When X-ray films are made of the teeth of a particular patient, the patient's name is entered on the top of the mount, and the picture or pictures are mounted in the discs 5 by mounting the side margin of a film in the slits 8, 8, then the disc is mounted on the mount by punching out the circular area within the perforations 2 and pressing against the reverse side of the ears 4, 4 extending them outwardly to receive the side margins of the disc 5, and the necessary data, such as date of the X-ray, is entered in the area provided beneath the window 3, and the mount conveniently and easily stored for easy reference. When it is desired to review the X-rays mounted on the mount, the mount itself may be mounted on the face of the usual X-ray viewer, or any other illumination means employed to view the X-ray films without removing same from the card.

While the foregoing is considered a preferred form of the invention, it is by way of illustration only, the broad principle of the invention being defined by the appended claims.

What I claim is:

1. In an X-ray film mount, a card, punch-out portions of partial perforations for forming circular windows nontransparent in said mount, outwardly extendable ears adjacent the periphery of said windows, circular discs having rectangular openings therein mountable over said windows and maintained in position by said ears, said discs having means for maintaining a film therein in position to be viewed through said windows.

2. In an X-ray film mount, a card having a series of rows of window forming punch-out areas, disc holding ears adjacent the periphery of said areas, nontransparent rigid discs mountable over said areas, said discs having windows formed therein and film holding means in said discs.

3. In an X-ray film mount, a cardboard member, a series of rows of circular window forming partially perforated punch-out areas in said member, disc holding means formed in said member, adjacent the periphery of each of said punch-out areas, film holding discs, each of said discs having a window formed therein and film holding slits adjacent said last mentioned window.

4. In an X-ray data holding member, a series of circular cuts partial forming a plurality of rows of punch-out areas, outwardly movable ears adjacent the periphery of each punch-out area, a nontransparent film holder mountable in said ears, said film holder having a rectangular opening and having means to engage a film and maintain same in position adjacent said area.

5. In an X-ray film mount, a data receiving card, circular partially perforated punchout areas formed in rows on said card, discs of greater diameter than the diameter of said punch-out areas, windows formed in said discs, means for maintaining X-ray film mounted on said discs and means formed in said card for receiving said discs over said punch-out areas.

References Cited

UNITED STATES PATENTS

| 1,381,674 | 6/1921 | Simpson | 40—158 |
| 1,474,174 | 11/1923 | Segall | 40—158 |
| 2,828,567 | 4/1958 | Shoan | 40—158 |
| 2,968,882 | 1/1961 | Ozeki | 40—106.1 |
| 2,903,808 | 9/1959 | Anderson | 40—158 |
| 3,195,258 | 7/1965 | Gwin | 40—158 |

EUGENE R. CAPOZIO, Primary Examiner.

W. J. CONTRERAS, Assistant Examiner.